United States Patent
Panasik et al.

(10) Patent No.: US 6,445,769 B1
(45) Date of Patent: Sep. 3, 2002

(54) INTERNAL BEARING COOLING USING FORCED AIR

(75) Inventors: Cheryl L. Panasik, Elburn; Thomas R. Miller, St. Charles; Gerald J. Carlson, Aurora, all of IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/696,413

(22) Filed: Oct. 25, 2000

(51) Int. Cl.$^7$ ................................................ H01J 35/10
(52) U.S. Cl. ...................................... 378/130; 378/141
(58) Field of Search ............................... 378/119, 121, 378/123, 125, 127, 130, 132, 141; 445/40

(56) References Cited

U.S. PATENT DOCUMENTS

| | | | |
|---|---|---|---|
| 4,501,566 A | * 2/1985 | Carlson et al. | 445/28 |
| 5,086,449 A | 2/1992 | Furbee et al. | 378/200 |
| 5,090,041 A | 2/1992 | Furbee | 378/93 |
| 5,241,577 A | 8/1993 | Burke et al. | 378/135 |
| 5,268,955 A | 12/1993 | Burke et al. | 378/135 |
| 5,299,249 A | 3/1994 | Burke et al. | 378/15 |
| 5,384,820 A | 1/1995 | Burke et al. | 378/135 |
| 5,448,612 A | * 9/1995 | Kasumi et al. | 378/84 |
| 5,802,140 A | 9/1998 | Virshup et al. | 378/136 |
| 6,011,829 A | 1/2000 | Panasik | 378/130 |
| 6,041,100 A | 3/2000 | Miller et al. | 378/141 |

OTHER PUBLICATIONS

U.S. patent application Ser. No. 09/593,641, Miller et al, filed Jun. 13, 2000, pending.

* cited by examiner

Primary Examiner—David P. Porta
(74) Attorney, Agent, or Firm—Fay, Sharpe, Fagan, Minnich & McKee, LLP

(57) ABSTRACT

A high energy x-ray tube includes an evacuated chamber (12) containing a rotor (34) which rotates an anode (10) through a stream of electrons (A) in order to generate an x-ray beam (B). The rotor includes a bearing assembly (C) having a hollow bearing shaft (52) centrally aligned with a longitudinal axis (Z) of the rotor. The bearing shaft includes an interior annular wall (54) having an inner surface which defines a central bore (58). The bearing shaft has an outer surface (60), which with an inner surface of the bearing shaft, defines an annular chamber (62). An opening (64) is provided at the forward end of the annular wall to provide access from the central bore to the annular chamber. During exhaust processing, baking cycles, and normal operation of the x-ray tube, a pump (104) forces a cooling medium through the central bore, through the opening of the annular wall, and into the annular chamber. The cooling medium exits through channels (66). While in the annular chamber, the cooling medium cools a plurality of forward and rearward lubricated bearings (48F, 48R) located adjacent an outer surface of the hollow bearing shaft.

26 Claims, 5 Drawing Sheets

INTERNAL BEARING COOLING USING FORCED AIR

BACKGROUND OF THE INVENTION

The present invention relates to the vacuum tube arts. It finds particular application in connection with reducing bearing assembly temperature in a rotating anode tube during operation as well as during the exhaust and baking process, thereby increasing bearing assembly life and rotating anode tube life and will be described with particular reference thereto. It should be appreciated, however, that the invention is also applicable for reducing bearing assembly temperature and increasing bearing assembly life in other vacuum systems.

A high power x-ray tube typically includes a rotating anode disposed within a glass envelope. A cathode supplies an electron beam to a target surface of the anode. When a high voltage differential causes the electron beam to strike the rotating anode, the beam heats the surface of the anode while generating x-rays which pass out of the glass envelope.

An induction motor is typically provided for rotating the anode. The anode is configured to rotate so that the heat energy will be spread over a relatively large area, thereby inhibiting the target area from overheating. The induction motor includes driving coils positioned outside the glass envelope and a rotor within the envelope which is connected to the anode. The rotor includes an outer, cylindrical armature or sleeve and an inner solid bearing member, which is centrally aligned within the armature. The armature and bearing member are centrally connected to the anode by a neck. A cylindrical bearing shaft is axially aligned with the armature and bearing member and is positioned therebetween. The bearing shaft is connected, at a rearward end, to a housing disposed outside the envelope.

When the motor of a typical x-ray tube is energized, the driving coils induce magnetic fields in the armature which cause the armature and bearing member to rotate relative to the stationary bearing shaft. Bearings, such as ball or roller bearings, are positioned between the bearing member and bearing shaft for allowing the bearing member, armature, and anode to rotate smoothly, relative to the bearing shaft. The bearings are positioned between bearing grooves provided in the bearing member and bearing races provided on the stationary bearing shaft. The bearing grooves and bearing races help maintain the proper positioning of the ball bearings. The ball bearings are typically coated with a solid metal lubricant. A metal lubricant is typically used, rather than a standard petroleum based lubricating compound, because the x-ray tubes operate in a vacuum requiring low vapor pressure. During normal operation, cooling oil is circulated to cool the bearings, preferably below 350° C.

During the manufacture of x-ray tubes, it is common to have the x-ray tubes undergo an exhaust process which removes unwanted molecules, such as water, from within the glass envelope. The exhaust process typically includes placing a number of x-ray tubes on individual stands in an oven to bake for a predetermined amount of time at a temperature of about 350° C. While in the baking oven, the interior of the tubes is connected with a vacuum pump which removes unwanted gases and molecules. The gases and molecules are outgassed during the baking cycle. Electrical and cooling oil connections are not made in the oven.

Under the heat of the baking oven, the lubricants on the bearings become hot and tend to evaporate and redistribute. The evaporation and redistribution of lead lubricant from a bearing race accelerates rapidly at temperatures over about 350° C. These temperatures can be reached in the bearings during the exhaust process. The evaporation and redistribution of the lead lubricant leads to a rapid degradation of the bearing surfaces and premature tube failure.

Thus, while it is advantageous to bake the x-ray tubes at higher temperatures for more efficient outgassing, the baking temperature is limited by the lubricant on the bearings. Previously, attempts to reduce the bearing temperature during the exhaust process included applying cool air to the exterior surface of the glass envelope. However, because the bearings are located deep inside the glass envelope, such a method does not provide much cooling assistance.

Moreover, the lubricants on the bearings also become hot and tend to evaporate and redistribute during normal operation of the x-ray tube. Again, evaporation and redistribution lead to undesirable degradation of the bearing surfaces and premature tube failure.

The present invention provides a new and improved bearing assembly and method of cooling for an x-ray tube which overcomes the above-referenced problems and others.

SUMMARY OF THE INVENTION

In accordance with a preferred method of preferentially reducing bearing temperature in an x-ray tube in order to increase bearing life, a hollow bearing passage is connected with a source of cooling fluid. The cooling fluid is passed through the hollow bearing passage to maintain an associated bearing assembly below a predetermined temperature.

In accordance with one aspect of the present invention, an x-ray tube assembly comprises an envelope defining an evacuated chamber. The envelope houses a cathode for providing a source of electrons and an anode positioned to be struck by the electrons and generate x-rays. A rotor is operatively connected to the anode for rotating the anode relative to the cathode. The rotor includes a bearing assembly having a hollow bearing shaft. A first air supply is connected to a tube which takes and directs cool air from the first air supply into and through the hollow bearing shaft where bearings of the bearing assembly are cooled.

In accordance with another aspect of the present invention, an x-ray tube includes an anode rotatably connected to a rotor. The rotor has a hollow bearing shaft for receiving cooling oil, air, or gas during operation. Bearings are disposed between the rotor and the bearing shaft. A method of manufacturing such an x-ray tube includes first baking the x-ray tube at a baking temperature. A vacuum is provided for pumping gases and molecules from an interior chamber of the x-ray tube. Concurrently with the baking step, a cooling medium is forced through the hollow bearing shaft to maintain the bearings below the annealing temperature.

In accordance with another aspect of the present invention, a manufacturing assembly for an x-ray tube includes a baking oven. An envelope is disposed within the baking oven. The envelope defines a chamber which houses a cathode for providing a source of electrons. The envelope also houses an anode positioned to be struck by the electrons and generate x-rays. A rotor is operatively connected to the anode for rotating the anode relative to the cathode. The rotor has a bearing assembly having a hollow bearing shaft. A vacuum pump is coupled to a tubular portion of the envelope for removing unwanted molecules and gases from the chamber. A supply pump is provided for supplying a cooling medium through the hollow bearing shaft so that bearing components of the bearing assembly can be cooled.

One advantage of the present invention is that it reduces bearing temperature during exhaust processing and normal operation.

Another advantage of the present invention resides in the ability to bake x-ray tubes at increased temperatures and for longer periods of time.

Another advantage of the present invention resides in the ability to better remove unwanted molecules from a glass envelope of an x-ray tube.

Another advantage of the present invention is that it increases the life of the rotating anode tube.

Still further advantages of the present invention will become apparent to those of ordinary skill in the art upon a reading and understanding of the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment, and are not to be construed as limiting the invention.

DETAILED DESCRIPTION OF THE PREFERRED EMBODIMENT

Figure 1:
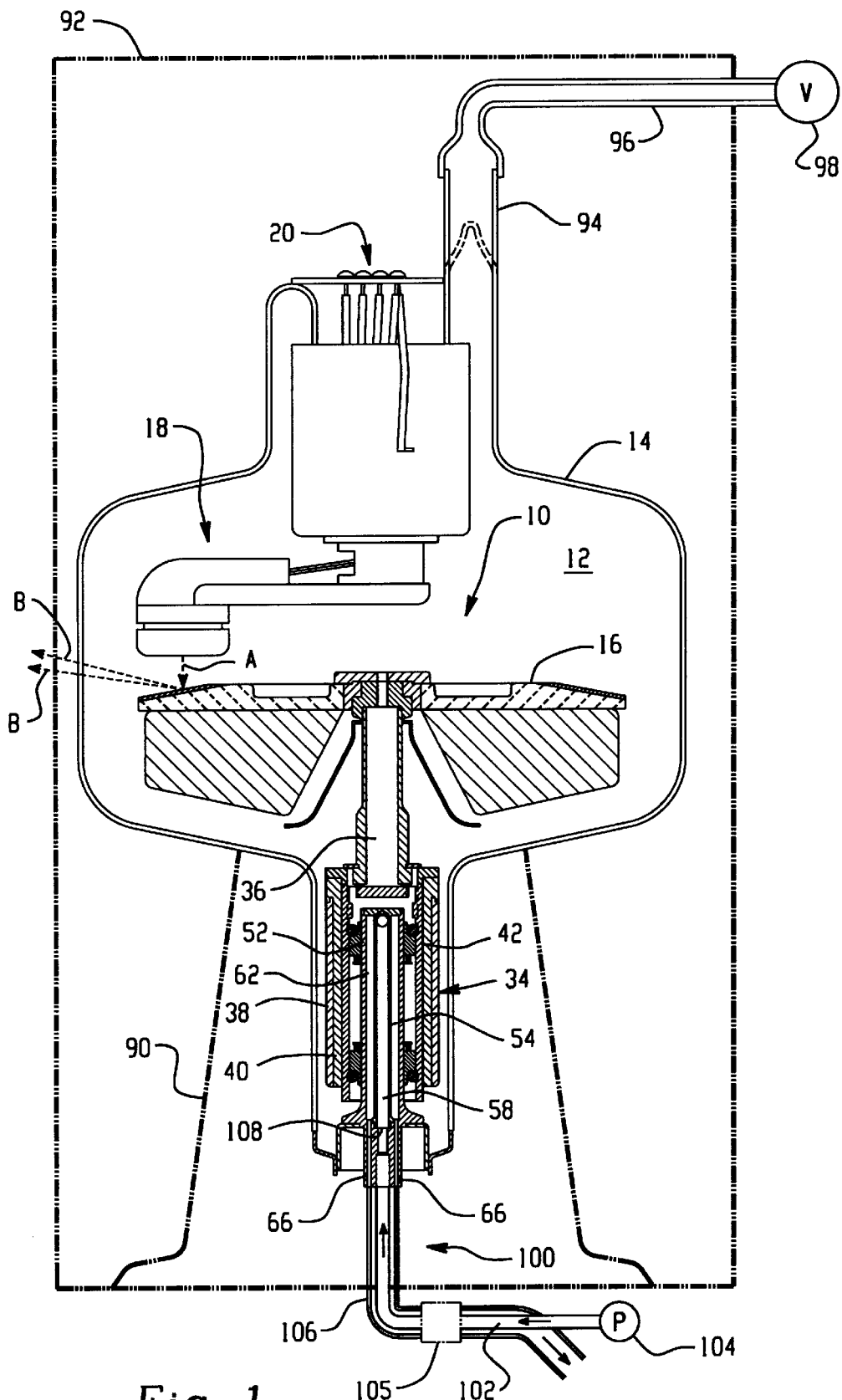
FIG. 1 is a schematic view of an x-ray tube in accordance with the present invention.

With reference to FIG. 1, a rotating anode x-ray tube of the type used in medical diagnostic systems, for providing a focused beam of x-ray radiation includes a rotating anode 10 which is operated in an evacuated chamber 12 defined preferably by a glass envelope 14. The anode is disc-shaped and beveled adjacent its annular peripheral edge to define an anode surface or target area 16. A cathode assembly 18 supplies and focuses an electron beam A which strikes the anode surface 16. Leads 20 enter through the glass envelope and are connected to the cathode assembly for supplying an electrical current to the assembly and for providing a high voltage differential between the anode and the cathode. When the electron beam strikes the rotating anode, a portion of the beam is converted into x-rays B which are emitted from the anode surface and through the envelope 14.

Figure 2:
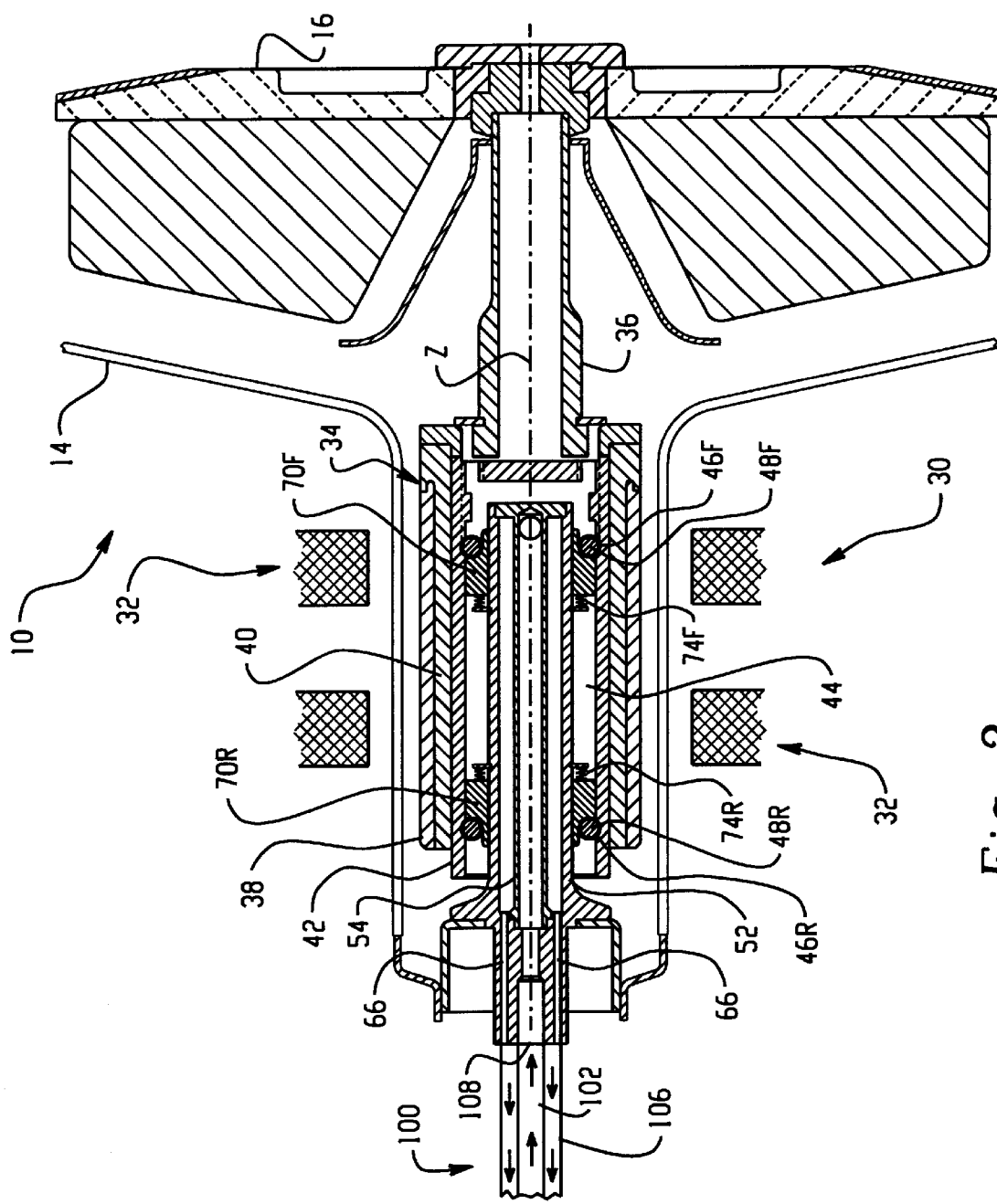
FIG. 2 is a sectional view of the rotor, neck and anode of the x-ray tube of FIG. 1.

With reference also to FIG. 2, an induction motor 30 is provided for rotating the anode 10. The induction motor includes a stator having driving coils 32 which are positioned outside the glass envelope 14. The induction motor further includes a rotor 34, having a substantially cylindrical configuration, disposed within the envelope. The rotor includes a neck 36, which interconnects the rotor 34 with the anode 10, and an outer, cylindrical armature or sleeve portion 38 formed from a thermally and electrically conductive material, such as copper. An intermediate cylindrical member 40, preferably fabricated from steel, circumferentially engages the inside diameter of the armature. Cylindrical member 40 provides rigidity and strength to the rotor.

Figure 3:
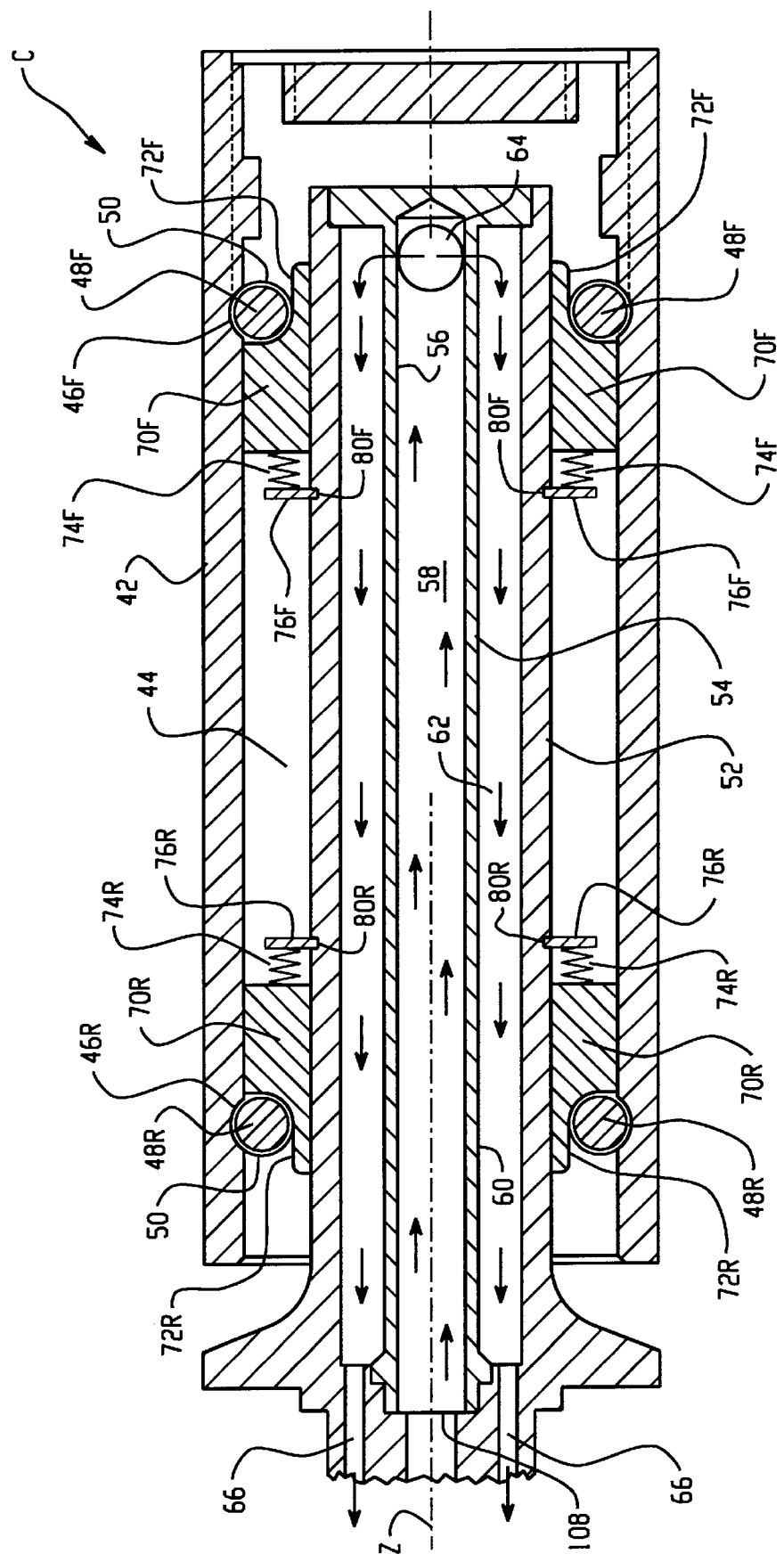
FIG. 3 is a sectional view of the bearing assembly of the x-ray tube of FIG. 1.

With reference also to FIG. 3, the rotor further includes a bearing assembly C. The bearing assembly includes an inner bearing member 42 centrally aligned with the armature and circumferentially engaging the inside diameter of cylindrical member 40. An inner surface of the bearing member defines a rotor cavity 44.

The inner bearing member has forward and rearward bearing grooves 46F, 46R configured to receive forward and rearward bearings 48F, 48R, respectfully, such as ball or roller bearings. Each of the ball bearings is coated with a lubricant 50 (not to scale), such as lead or silver, at a thickness of about 400–3000 Å. As used herein, the terms "forward," and "rear," and the like, are used to define relative positions of components along a central longitudinal axis Z of the rotor. Components which are described as forward are closer to the anode, while components described as rearward are further from the anode.

The bearing assembly further includes a hollow bearing shaft 52 centrally aligned with the rotor and configured to be inserted into the rotor cavity 44. The rearward end of the bearing shaft extends outside the glass envelope 14 (see FIG. 1). The bearing shaft 52 includes an interior annular wall 54 having an inner surface 56 which defines a central bore or passageway 58. Annular wall 54 has an outer surface 60, which with an inner surface of the bearing shaft, defines an annular chamber 62. An opening 64 is provided at the forward end of wall 54, thus providing access from passageway 58 to chamber 62.

A first forward bearing race 70F and a second rearward bearing race 70R are circumferentially disposed around forward and rearward portions of the bearing shaft, respectfully. Each bearing race has a seat 72F, 72R formed therein of a generally semicircular shape, which is dimensioned to receive its respective plurality of the ball bearings 48F, 48R. The bearing races are configured to urge the ball bearings 48F, 48R into an optimal position within their respective bearing grooves 46F, 46R.

In order to urge the ball bearings into an optimal position, forward and rearward biasing systems 74F, 74R are preferably provided behind the forward and rearward bearing races 70F, 70R, respectfully. In order to hold the races and biasing systems in place, retaining rings 76F, 76R are connected to the free ends of the springs 74F, 74R, respectively. Retaining rings 76F, 76R are dimensioned to be snapped into snap ring grooves 80F, 80R, respectfully, which are disposed at predetermined locations along the bearing shaft.

During the manufacture of the above-described x-ray tube, the x-ray tube undergoes an exhaust process which removes unwanted molecules, such as water, from the evacuated chamber 12. With reference to FIG. 1, the exhaust process includes placing the x-ray tube on a stand 90 in a baking oven 92. A tubular portion 94 of the glass envelope 14 is coupled by a vacuum line 96 to a vacuum pump 98 which removes the unwanted molecules and gases from the chamber 12. When the exhaust process has been completed, the tubular portion 94 is sealed.

During the degassing process, the tube is baked for a predetermined amount of time at a temperature of 400° C. or more. At 400° C., the lubricant on the ball bearings would have a tendency to evaporate and redistribute. Evaporation and redistribution accelerates rapidly at temperatures over 350° C. Such evaporation and redistribution of the lubricant leads to rapid degradation of the bearing surfaces and premature tube failure.

In order to reduce the problems associated with lubricant evaporation and redistribution, the bearing assembly C is connected with a coolant tube 100 of a cooling system. In the preferred embodiment, the coolant tube includes an inner conduit 102 which supplies cool air from a cool air supply or pump 104 to the bearing central bore 58. The pump may be any suitable pump, such as a vortex pump. Optionally, a chiller 105 (shown in phantom) chills the air before the air enters central bore 58. An outer conduit 106 carries heat exhaust air from annular bearing chamber 62 to the exterior of the oven. Optionally, the exhaust air can be discharged directly into the oven 92 through channels 66 (see FIG. 2).

Preferably, the cooling system forces the cool air or other fluid cooling medium through an opening 108, located in the rearward end of the bearing shaft 52, and into the central bore 58 of the bearing shaft (see FIGS. 2 and 3). In a preferred embodiment, the cooling medium is compressed air. The cooling medium travels to a forward end of central bore 58, through opening 64, and into annular chamber 62. Preferably, the compressed air source 104 supplies the compressed air at a pressure that causes laminar flow in the bore 58 and the channel 66. Alternately, turbulent flow conditions can be created. Because annular chamber 62 is in close proximity with the ball bearings 48F, 48R and the lubricant 50, the cooling medium reduces the temperature of the ball bearings and the lubricant. The cooling medium ultimately exits through channels 66 into the baking oven or through the exhaust passage 106.

By reducing the temperature of the bearings and the lubricant, redistribution and evaporation of the lubricant is minimized. Thus, degradation of the bearing surfaces is minimized which increases the life of the x-ray tube to the ultimate user. Moreover, preferentially cooling the bearing components enables the anode and other components to be heated to higher temperatures. Increasing the temperature of the baking oven enhances the exhaust system's efficiency in removing unwanted absorbed molecules and gases. The increased efficiency may permit shorter annealing times.

Figure 4:
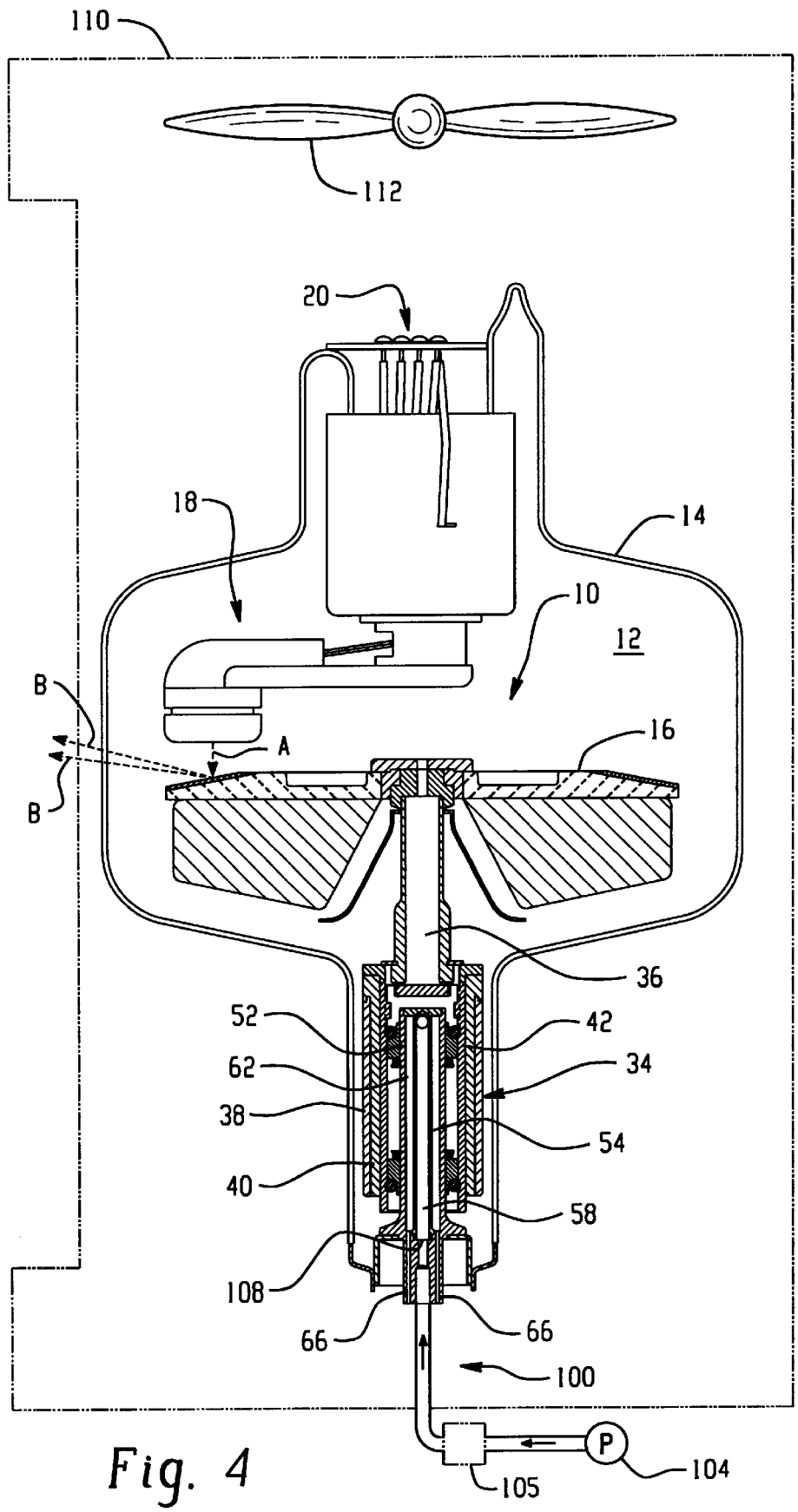
FIG. 4 is a schematic view of an x-ray system in accordance with the present invention.

After the exhaust process has been completed, the x-ray tube is substantially ready for operation. With reference to FIG. 4, the x-ray tube may optionally be placed in a protective housing 110 (shown in phantom) before being operated. During operation, much of the heat generated from the rotating anode 10 is dissipated into the bearing assembly. As noted above, as the temperature of the bearing assembly increases, the lubricant on the ball bearings would have a tendency to evaporate and redistribute leading to rapid degradation of the bearing surfaces and premature tube failure. In order to minimize these problems, the cooling system of the present invention enables forced air or water to internally cool the bearing assembly.

During operation, the cooling system works much like the cooling system works during the exhaust process. The air supply or pump 104, such as a vortex pump, forces a cooling medium, preferably cool air or oil, through coolant tube 100 and into central bore 58 of the bearing shaft 52. optionally, chiller 105 (shown in phantom) is provided which enables the cooling fluid to be cooled before reaching central bore 58. This is particularly helpful if the cooling medium is air. The cooling medium travels to a forward end of central bore 58, through opening 64, and into annular chamber 62 where cooling of the bearing assembly takes place. Preferably, the cooling medium is compressed air. The air exits the system through channels 66 rather than being recirculated through a heat exchanger.

In addition to internal cooling, another cool air supply 112, such as an air blower or fan, is preferably provided outside the x-ray tube. Such an air supply may be used both during exhaust processing and normal operation. The air blower provides air over the exterior of the x-ray tube which enhances the cooling abilities of the x-ray system. Optionally, air supply 112 may be a vortex pump. Air supply 112 helps remove or blow the cooling medium away from the x-ray system after the cooling medium has exited channels 66.

Figure 5:
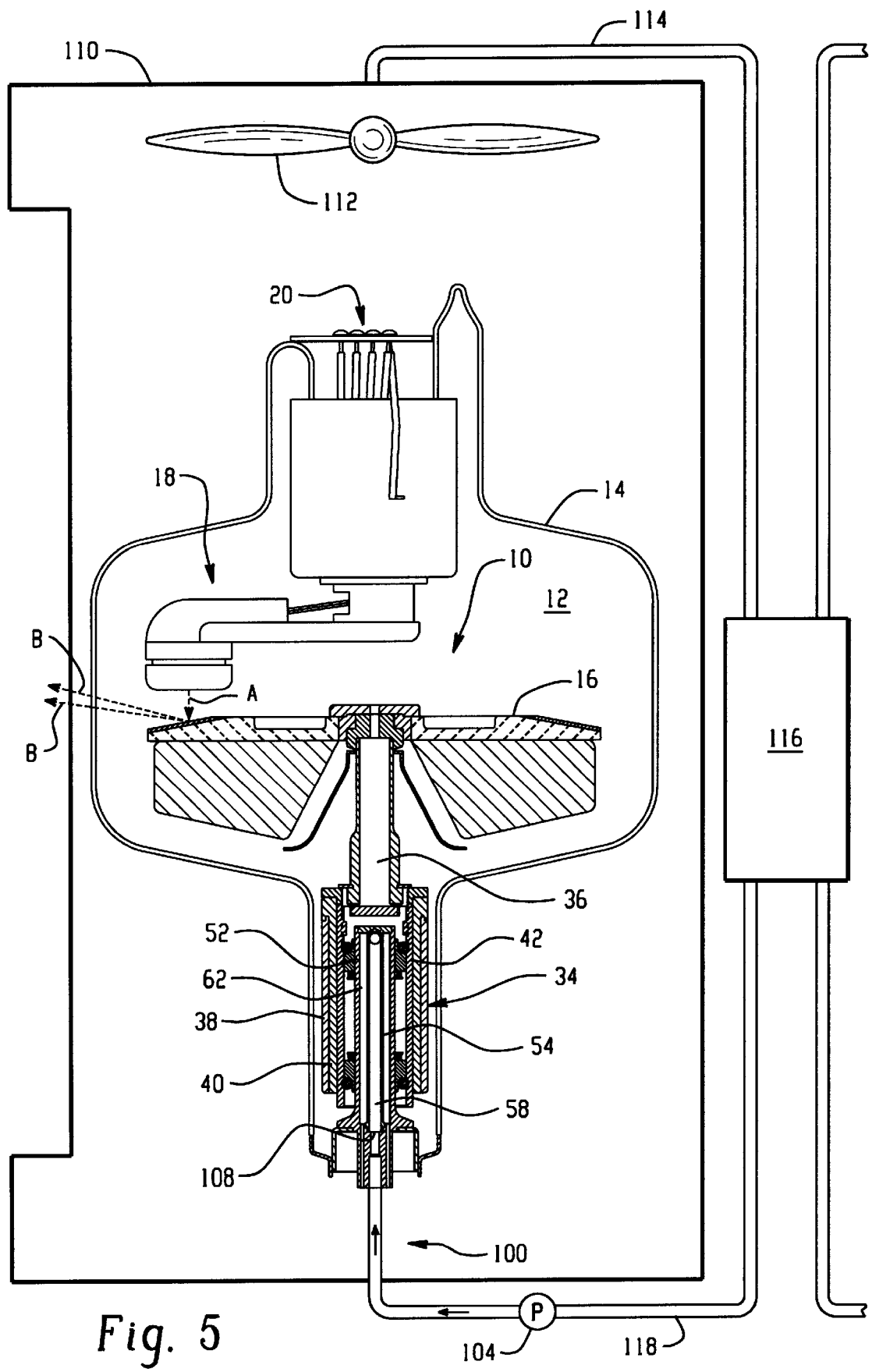
FIG. 5 is a schematic view of an x-ray system in accordance with the present invention.

With reference to FIG. 5, the cooling medium may be something other than compressed air, such as water. If the cooling medium is water, the water is recirculated through a closed circuit. The water exits housing 110 through a return conduit 114 which carries the water to the heat a exchanger 116 so that heat can be dissipated. After traveling through the heat exchanger, the water travels through conduit 118 (shown in phantom) to pump 104 where it is ready to be used for cooling the bearing assembly.

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claims or the equivalents thereof.

Having thus described the preferred embodiment, the invention is now claimed to be:

1. A method of reducing bearing temperature in an x-ray tube to increase bearing life, the method comprising:

passing a cooling fluid through a hollow bearing passage to maintain an associated bearing assembly below a predetermined temperature, the bearing assembly including a hollow bearing shaft which has an interior annular wall having an inner surface defining a central bore and an outer surface which with an inner surface of the bearing shaft defines an annular chamber, the passing step further including:

forcing the cooling fluid into the central bore, through an opening in the central bore, and into the annular chamber where cooling of a plurality of bearings takes place.

2. A method according to claim 1, further comprising the step of:

after connecting the hollow bearing passage with a source of cooling fluid, operating the x-ray tube.

3. A method of reducing bearing temperature in an x-ray tube to increase bearing life, the method comprising the steps of:

connecting a hollow bearing passage with a source of cooling fluid;

after connecting the hollow bearing passage with the source of cooling fluid, connecting an interior of the x-ray tube with a vacuum source to evacuate the interior of gases;

after connecting the interior of the x-ray tube with a vacuum source, placing the x-ray tube in a baking oven and baking the tube at a preselected temperature to outgas components in the interior; and passing the cooling fluid through the hollow bearing passage to maintain an associated bearing assembly below a predetermined temperature.

4. A manufacturing assembly for an x-ray tube comprising:

a baking oven;

an envelope disposed within the baking oven, the envelope defining a chamber which houses a cathode for providing a source of electrons and an anode positioned to be struck by the electrons and generate x-rays;

a rotor operatively connected to the anode for rotating the anode relative to the cathode, the rotor having a bearing assembly which has a hollow bearing shaft;

a vacuum pump coupled to a tubular portion of the envelope for removing unwanted molecules and gases from the chamber; and a supply pump for supplying a cooling medium through the hollow bearing shaft so that bearing components of the bearing assembly can be cooled.

5. The method according to claim 3, wherein the passing step includes passing the cooling fluid through the hollow bearing passage at a pressure that causes laminar flow of the cooling fluid.

6. The method according to claim 3, wherein the baking oven is heated to a temperature greater than 400° C.

7. The method according to claim 3, wherein the baking oven is heated to a temperature greater than 425° C.

8. The method according to claim 7, wherein the bearings are coated with lead and the passing step maintains the bearings below 370° C.

9. The method according to claim 7, wherein the bearings are maintained below 350° C.

10. The method according to claim 3, wherein the cooling fluid is compressed air.

11. The method according to claim 3, wherein the cooling fluid is one of oil and gas.

12. A method of reducing bearing temperature in an x-ray tube to increase bearing life, the bearings being coated with lead and disposed in a chamber of the x-ray tube with a cathode and an anode, the method comprising:

connecting a hollow bearing passage with a source of cooling fluid; and passing the cooling fluid through the hollow bearing passage to maintain an associated bearing assembly below a predetermined temperature, whereby a tendency of the lead coating to evaporate into the chamber during exhausting or operating the tube is reduced.

13. An x-ray tube assembly comprising:

an envelope defining an evacuated chamber, said envelope housing a cathode for providing a source of electrons and an anode positioned to be struck by the electrons and generate x-rays;

a rotor operatively connected to the anode for rotating the anode relative to the cathode, the rotor including.

a bearing assembly including a central tubular shaft surrounded by a hollow bearing shaft, and bearings disposed in the evacuated chamber between the bearing shaft and a cylindrical sleeve on which the anode is supported, the bearings having a coating, the coating tending to evaporate into the evacuated chamber when heated; and a first air supply connected to the tubular shaft which takes and directs cool air from the first air supply into and through the hollow bearing shaft such that the bearings of the bearing assembly are cooled by the cool air flowing thereover, reducing the tendency of the coating to evaporate into the evacuated chamber.

14. The x-ray tube assembly according to claim 13, further comprising a second air supply for applying air over the exterior of the envelope of the x-ray tube assembly.

15. The x-ray tube assembly according to claim 14, wherein at least one of the first air supply and the second air supply is a vortex pump.

16. The x-ray tube assembly according to claim 13, further comprising a chiller disposed upstream from the first air supply.

17. A method for manufacturing an x-ray tube, the x-ray tube having an anode rotatably connected to a rotor, the rotor having a hollow bearing shaft for receiving cooling oil, air, or gas during operation, and bearings between the rotor and the bearing shaft, the method comprising:

baking the x-ray tube at a baking temperature;

vacuum pumping gases and molecules from an interior chamber of the x-ray tube; and concurrently with the baking, forcing a cooling medium through the hollow bearing shaft to maintain the bearings below the baking temperature.

18. The method according to claim 17, wherein the hollow bearing shaft has an interior annular wall having an inner surface defining a central bore and an outer surface which with an inner surface of the bearing shaft defines an annular chamber, and wherein the forcing step further includes:

forcing the cooling medium into the central bore, through an opening in the central bore, and into the annular chamber where cooling of the plurality of bearings takes place.

19. The method according to claim 17, wherein the baking temperature is greater than 400° C.

20. The method according to claim 19, wherein the bearings are coated with lead and the forcing step maintains the bearings below 370° C.

21. The method according to claim 19, wherein the bearings are maintained below 350° C.

22. The method according to claim 17, wherein the baking temperature is greater than 425° C.

23. The method according to claim 17, wherein the bearings are coated with silver.

24. The method according to claim 17, wherein the forcing step includes forcing compressed air through the hollow bearing shaft.

25. The method according to claim 17, wherein the forcing step includes forcing the cooling medium at a pressure that causes a laminar flow of the cooling medium through the hollow bearing shaft.

26. An x-ray tube apparatus manufactured by the method of claim 17.

* * * * *